US007572353B1

(12) United States Patent
Vander Griend

(10) Patent No.: US 7,572,353 B1
(45) Date of Patent: Aug. 11, 2009

(54) ETHANOL DISTILLATION PROCESS

(75) Inventor: Dennis Lee Vander Griend, Colwich, KS (US)

(73) Assignee: ICM, Inc., Colwich, KS (US)

( * ) Notice: Subject to any disclaimer, the term of this patent is extended or adjusted under 35 U.S.C. 154(b) by 241 days.

(21) Appl. No.: 11/508,425

(22) Filed: Aug. 23, 2006

Related U.S. Application Data

(62) Division of application No. 10/184,230, filed on Jun. 28, 2002, now Pat. No. 7,297,236.

(60) Provisional application No. 60/301,944, filed on Jun. 30, 2001, provisional application No. 60/312,716, filed on Aug. 16, 2001.

(51) Int. Cl.
*B01D 3/10* (2006.01)
*C07C 31/08* (2006.01)
*C12G 3/12* (2006.01)

(52) U.S. Cl. .............................. 203/19; 203/25; 203/27; 203/41; 203/73; 203/DIG. 8; 210/694; 426/11; 426/494; 435/161

(58) Field of Classification Search ................ 159/17.1, 159/47.1, DIG. 8, DIG. 16; 202/174, 205; 203/19, 25, 27, 41, 73, DIG. 7, DIG. 8, DIG. 9; 210/694, 774; 426/11, 493, 494; 435/161
See application file for complete search history.

(56) References Cited

U.S. PATENT DOCUMENTS

| 4,149,940 A | 4/1979 | Pinto |
| 4,305,790 A | 12/1981 | Kramer, Sr. |
| 4,309,254 A | 1/1982 | Dahlstrom et al. |
| 4,328,074 A | 5/1982 | Standiford |
| 4,374,705 A | 2/1983 | Sawai et al. |
| 4,375,387 A | 3/1983 | deFilippi et al. |
| 4,422,903 A | 12/1983 | Messick et al. |
| 4,428,799 A | 1/1984 | Standiford |
| 4,511,437 A | 4/1985 | Heck et al. |
| 4,522,920 A | 6/1985 | Thorsson et al. |
| 4,539,076 A | 9/1985 | Swain |
| 4,626,321 A | 12/1986 | Grethlein et al. |
| 4,645,569 A | 2/1987 | Akabane et al. |
| 4,692,218 A | 9/1987 | Houben et al. |
| 4,961,826 A | 10/1990 | Grethlein et al. |

(Continued)

FOREIGN PATENT DOCUMENTS

CA            958998        12/1974

(Continued)

*Primary Examiner*—Virginia Manoharan
(74) *Attorney, Agent, or Firm*—Robert O. Blinn

(57) ABSTRACT

A process arrangement for distilling fuel grade ethanol include a distillation portion which distills beer to produce thin stillage and hot ethanol vapor. In an evaporation portion, a set of first effect evaporators which are heated either by plant steam or hot ethanol vapor, concentrate thin stillage into mid stillage while producing first effect steam. The first effect steam from the first effect evaporators provides heat to a set of second effect evaporators which concentrate the mid stillage into a syrup for further drying. The second effect evaporators produce second effect steam which is used to heat the distillation portion of the process arrangement. The multiple evaporators of the first and second effects of the evaporation portion can be selectively taken off-line for maintenance while the evaporation portion and the remainder of the process arrangement continue to operate at full capacity.

17 Claims, 5 Drawing Sheets

U.S. PATENT DOCUMENTS

| | | | |
|---|---|---|---|
| 5,035,776 | A | 7/1991 | Knapp et al. |
| 5,124,004 | A | 6/1992 | Grethlein et al. |
| 5,294,304 | A | 3/1994 | Kano et al. |
| 5,300,197 | A | 4/1994 | Mitani et al. |
| 5,316,782 | A * | 5/1994 | Zimlich, III ............... 426/624 |
| 5,458,739 | A | 10/1995 | Boucher et al. |
| 5,624,534 | A | 4/1997 | Boucher et al. |
| 6,755,975 | B2 | 6/2004 | Vane et al. |
| 2003/0019736 | A1 | 1/2003 | Garman |

FOREIGN PATENT DOCUMENTS

| | | |
|---|---|---|
| CA | 1278315 | 12/1990 |
| CA | 1280041 | 2/1991 |
| CA | 1282358 | 4/1991 |
| CA | 1289024 | 9/1991 |
| CA | 1305096 | 7/1992 |
| CA | 1307232 | 9/1992 |
| CA | 2115578 | 3/1993 |
| CA | 1327537 | 3/1994 |
| CA | 2110878 | 7/1994 |
| CA | 1333367 | 12/1994 |
| CA | 2179615 | 6/1995 |
| CA | 2133398 | 3/1996 |
| CA | 2367813 | 7/2002 |
| WO | WO 88/02649 | 4/1988 |

* cited by examiner

ETHANOL DISTILLATION PROCESS

CROSS REFERENCES TO RELATED APPLICATIONS

This application is a divisional of U.S. Non-Provisional application No. 10/184,230 now U.S. Pat. No. 7,297,236 filed Jun. 28, 2002. U.S. Non-Provisional application No. 10/184,230 claimed the benefit of U.S. Provisional Patent Application No. 60/301,944 filed Jun. 30, 2001 and U.S. Provisional Patent Application No. 60/312,716 filed Aug. 16, 2001.

FIELD OF THE INVENTION

This invention relates to a process for distilling motor fuel grade ethanol.

BACKGROUND OF THE INVENTION

Fuel grade ethanol distilled from grain has become increasingly popular as an alternate fuel for motor vehicles. Ethanol has also increased in popularity as a gasoline additive for formulating clean burning grades of gasoline for motor vehicles.

A fuel grade ethanol production process typically includes the steps of fermentation, distillation and evaporation. In the fermentation portion of a typical process, a slurry of milled corn is fermented to produce a beer having a concentration of ethanol that is usually no more than approximately 15% by volume. In the distillation portion of a typical process, the ethanol in the beer is extracted in distillation columns. Distillation columns typically have a multitude of horizontal trays for bringing rising ethanol vapor and descending liquid into contact. In a distillation column, low pressure steam percolates up through the beer as the beer cascades from higher trays to lower trays. As the rising steam heats the beer, the ethanol in the beer evaporates and rises to the top of the column where it exits as a vapor. The remaining water and other grain material in the beer descends to the bottom of the column to exit as "beer bottoms". After solids have been removed from the beer bottoms, the remaining liquid known as thin stillage is reduced in the evaporation portion of the process where liquid is boiled away from the thin stillage to produce a syrup.

To produce fuel grade ethanol, more than one interconnected distillation column is typically used to progressively purify the ethanol product. In a typical ethanol distillation process, a beer column receives beer and produces an intermediate ethanol vapor. A rectifier column receives the intermediate ethanol vapor from the beer column and produces 190 proof or 95% pure ethanol vapor. A third, side stripper column receives bottoms from the rectifier column and then produces an intermediate ethanol overhead vapor that is further purified by the rectifier column. The ethanol free bottoms from the side stripper column can be used to formulate cook water for the fermentation portion of the process. Because of the physical properties of an ethanol water solution, a distillation process can only practically produce an ethanol water solution that is approximately 95% ethanol and 5% water. A dehydrator is used to remove most of the remaining water to produce higher purity product. The dehydrator receives the 95% ethanol vapor and removes nearly all of the remaining water to produce ethanol having a water content of less than 0.25%. A dehydrator may contain beads of material which attract water to a greater degree than ethanol.

A fuel grade ethanol distillation process like the one described above also produces co-products. The fermentation portion of the process generates carbon dioxide gas which is often recovered for various industrial uses. The distillation portion of the process generates the above mentioned beer bottom byproduct that is free of ethanol and which contains unfermented solid remnants of the milled grain that was fermented to produce ethanol. This beer bottom byproduct can be mechanically separated into a mostly liquid component known as thin stillage and a mostly solid component know as distiller's grains. A drier can be employed to dry the distiller's grains to produce dry product. The distiller's grains are high in protein and therefore make an excellent feed for farm livestock. Because releasing the thin stillage would amount to a release of waste water, the thin stillage is usually evaporated in evaporators to produce a syrup which can also be dried in the distiller's grain dryer to further increase the output of the animal feed co-product.

The economic constraints confronting a fuel grade ethanol producer are more challenging than those faced by a distiller of spirits for human consumption. This is because fuel grade ethanol must have virtually no water content and it must be produced at low cost. Accordingly, it is an object of this invention to provide a process arrangement for distilling ethanol that conserves energy and water. It is another object of this invention to provide a process arrangement for distilling ethanol that uses sets of evaporators that can each be taken off-line for maintenance while the evaporation portion of the process continues to operate at full capacity. It is yet another object of this invention to provide an ethanol distillation process arrangement that uses waste heat from the evaporators to heat the distillation portion of the process.

BRIEF DESCRIPTION

These and other objects of the invention are attained in an ethanol distillation process arrangement that uses a minimum of energy and operates with a minimum of down time. The ethanol distillation process of the present invention includes a fermentation portion, a distillation portion, an ethanol dehydration portion, a distiller's grain separation and drying portion and a thin stillage evaporation portion.

In the fermentation portion of the process, a milled corn slurry is fermented to produce an ethanol laden beer. In the distillation portion of the process, ethanol is evaporated from the beer and captured for further purification in the dehydration process. The distillation portion of the process preferably includes a beer column, a rectifier column and a side stripper column. As with most typical ethanol distillation process arrangements, the beer column receives beer and produces an intermediate ethanol vapor which the rectifier column receives and further distills into a 190 proof or 95% pure ethanol vapor. The side stripper column receives bottoms from the rectifier column and returns intermediate ethanol vapor to the rectifier column for further purification. As noted above, the beer column also produces beer bottoms which include unfermented grain solids and thin stillage comprised mostly of liquid water.

The dehydration portion of the process employs a steam heated molecular sieve dehydrator which receives condensed ethanol liquid that is approximately 190 proof or 95% pure from the distillation portion of the process. The steam heated molecular sieve dehydrator produces hot, ethanol vapor having a purity above 199.5 proof or 99.75%.

The beer bottoms from the beer column containing unfermented distiller's grains are conveyed to the distiller's grain separation and drying portion of the process. In the distiller's grain separation and drying portion of the process, the beer bottoms are mechanically separated into mostly solid distiller's grains and mostly liquid thin stillage. The distiller's grains can then be dried in a dryer. The thin stillage is conveyed to the evaporation portion of the process where it is reduced in a series of evaporators to a syrup that can also be dried along with the distiller's grains.

The ethanol distillation process of the present invention uses an arrangement of two sets of evaporators in the evaporation portion of the process, namely, a set of first effect evaporators and a set of second effect evaporators. The evaporators of these two sets, receive stillage and progressively concentrate in into a syrup. Each of the evaporators has an upper shell and tube heat exchanger portion and a lower pot portion for collecting concentrated stillage. The heat exchanger portions are heated on their shell sides and boil stillage on their tube sides. In this arrangement, the evaporators of each set are interconnected so that one of the evaporators of each set can be bypassed and taken off-line for cleaning and maintenance while the other evaporators of the set continue to operate. Preferably, the evaporators of each set are sized so that the set can continue to operate at full capacity even if one of the evaporators in the set is bypassed and taken off-line. Also with this evaporator arrangement, the first set of first effect evaporator are heated either by clean plant steam or hot, ethanol vapor produced by the molecular sieve dehydrator. (When the hot ethanol vapor product is used to provide heat in one or two of the first effect evaporators, the ethanol vapor is not mixed with plant steam.) The second effect evaporators are heated by first effect steam produced by the boiling of water from the thin stillage in the first effect evaporators. The second effect evaporators process stillage that is more concentrated than the stillage processed by the first effect evaporators and therefore should operate at a lower temperature than the first effect evaporators. Low pressure steam produced by the second effect evaporators by the boiling of water from mid stillage, known as second effect steam, is not vented as waste heat but is piped to the beer distillation column to provide sufficient heat for the beer distillation column.

The advantages of this arrangement are substantial. First, what would be waste heat from the evaporation process is used to provide the heat for the evaporation of ethanol in the distillation process. This energy flow in this arrangement is generally inverted from one wherein the waste heat from the distillation process is used to heat the evaporation process. Steam which heats a distillation process is directly mixed with the beer as ethanol is evaporated. Clean, plant steam, when used in a distillation process, is contaminated and must be replaced with clean water. Accordingly, water and clean plant steam are conserved if waste steam from the second set of evaporators is used to heat the distillation process instead of clean, plant steam. In the present invention process, clean plant steam is used primarily on the shell side of the heat exchanger portions of the first effect evaporators so that when the plant steam is condensed it can be returned to a boiler without cleaning or processing. Moreover, the low pressure, low temperature second effect steam produced by the second effect evaporators is more appropriate for use in a beer column where ethanol is being evaporated at a relatively low temperature. Distillation columns accumulate solid residues less rapidly when operated at lower temperatures. Although prior art processes may use a reboiler in combination with the beer column where plant steam exchanges heat with part of the beer in a beer column, such a reboiler must be shut down and taken off-line for periodic cleaning. If low temperature steam produced by the second effect evaporators is used to heat the beer column, no reboiler is needed and that column should not need cleaning over very long periods of time that may even extend through the life of a plant. This can significantly reduce the amount of time that an ethanol distillation facility must be shut down.

The series arrangement of the evaporator units of each set of evaporator units is particularly advantageous because the units can be interconnected and valved so that one of the units in the series can be taken off-line and bypassed while the other units in the series continue to operate. With this arrangement, if evaporator units are sized so that for example, four first effect evaporators and four second effect evaporators are present when three first effect evaporators or three second effect evaporators can serve the facility as it runs at full capacity, then one of those four first effect evaporators or four second effect evaporators can be shut down, isolated and cleaned while the remaining three first effect evaporators or three second effect evaporators and the rest of the facility continue to operate at full capacity. It is an important competitive advantage for a ethanol distillation facility to be capable of operating continuously in a steady state condition, even when an evaporator—a component that are most often in need of periodic cleaning—is isolated and cleaned. Down time represents idle capital and loss of ethanol production. Still further, significant process problems often arise during start up operations and such problems can be best avoided by not shutting a facility down in the first place. Where a prior art facility may need to be completely shut down for a day of two days every month, a facility that employs the process arrangement of the present invention may run continuously for many months.

The energy, water and down time savings resulting from the above described process arrangement provide significant economic advantages to a facility operator. By improving the economics of fuel grade ethanol distillation, the process of the present invention yields significant value in a growing industry.

BRIEF DESCRIPTION OF THE DRAWINGS

The invention and its many attendant objects and advantages will become better understood upon reading the following description of the preferred embodiment in conjunction with the following drawings, wherein.

DETAILED DESCRIPTION OF THE INVENTION

Figure 1:
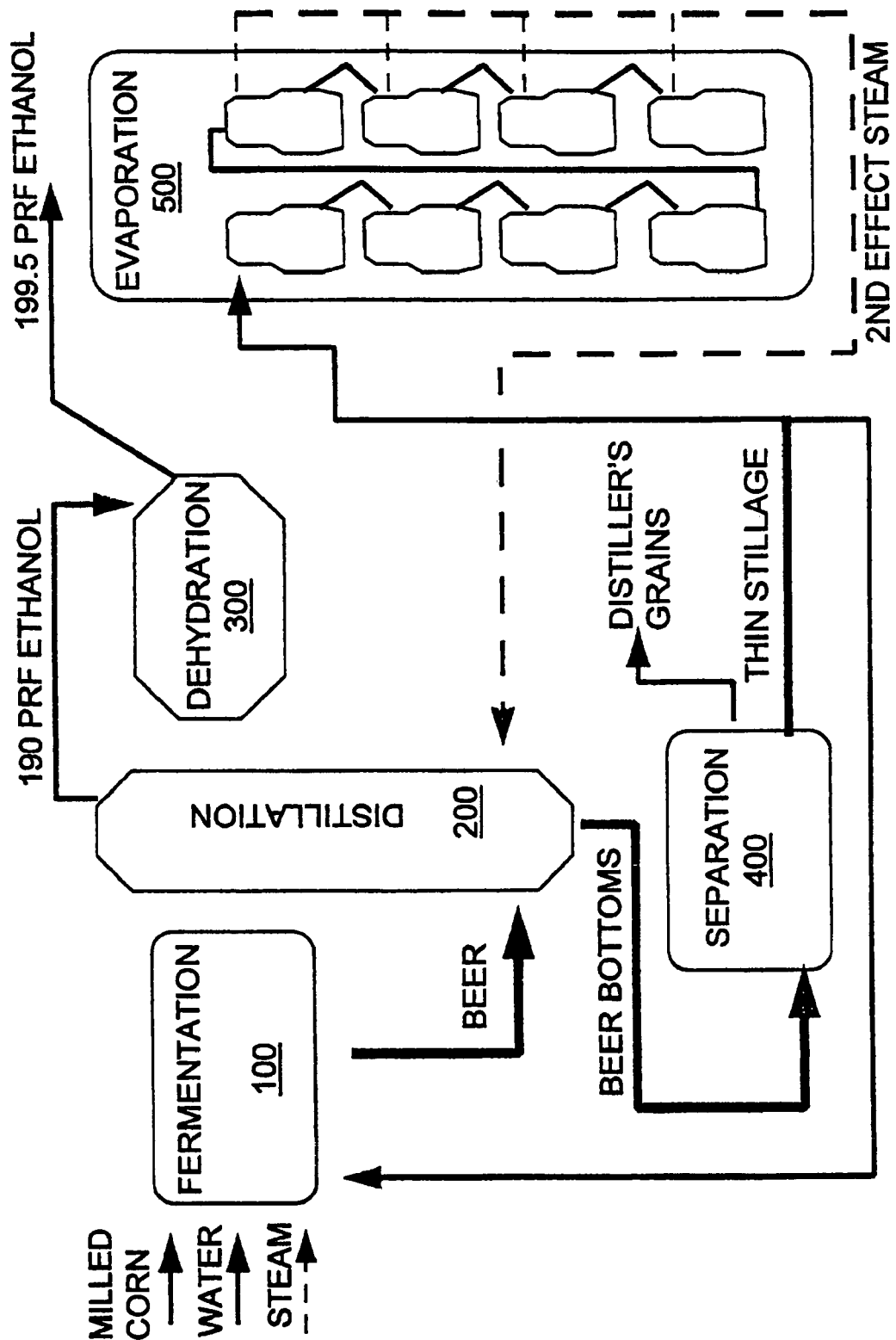
FIG. 1 is a process diagram showing the process arrangement of the present invention.

FIG. 1 provides an overview of the invention ethanol distillation process arrangement 10. As illustrated in FIG. 1, the invention ethanol distillation arrangement 10 includes a fermentation portion 100, a distillation and dehydration portion 200, a condensation and dehydration portion 300, a separation and drying portion 400 and an evaporation portion 500.

Figure 2:
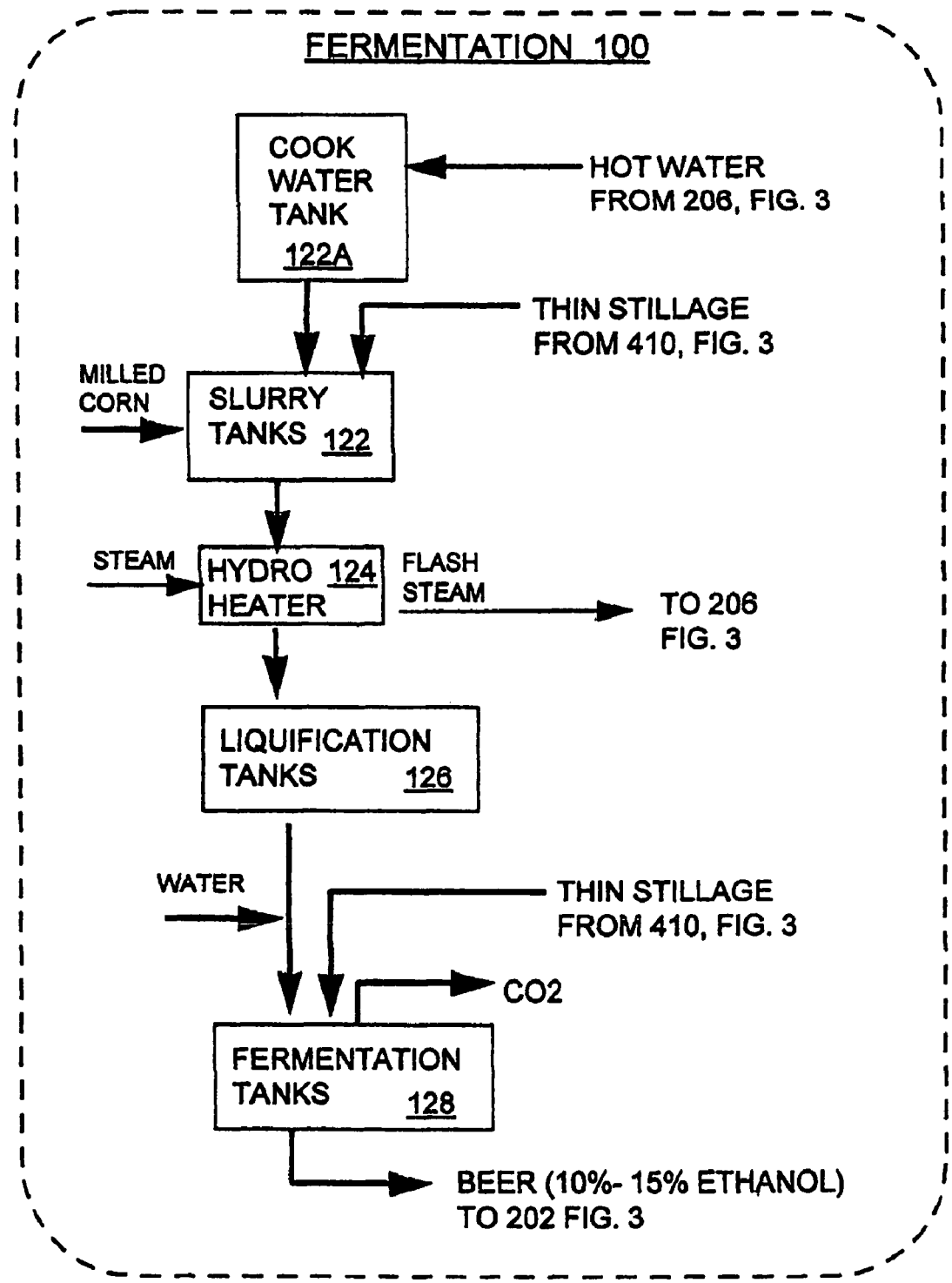
FIG. 2 is a process diagram showing the fermentation portion process arrangement of the present invention.

As shown in FIG. 2, fermentation portion 100 includes slurry tanks 122 where hot water and milled corn are mixed, a cook water tank 122A that provides hot water to slurry tanks 122, a hydro-heater 124 where the slurry from slurry tanks 122 is heated under pressure, liquification tanks 126 where the resulting mixture is further processed prior to fermentation and finally fermentation tanks 128 where the mixture is fermented to produce an ethanol mixture known to those skilled in the art as "beer".

Figure 3:
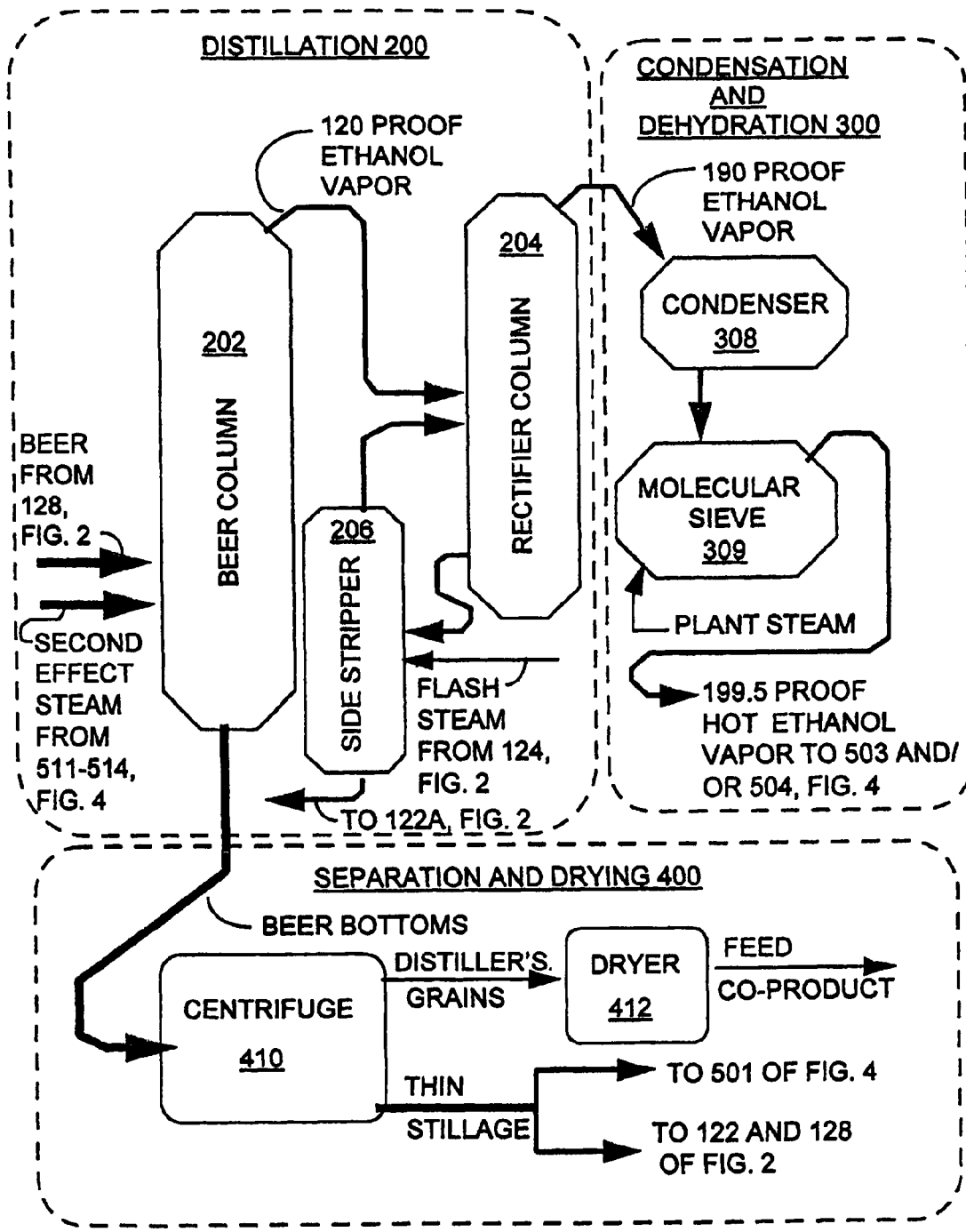
FIG. 3 is a process diagram showing the distillation, ethanol dehydration, beer bottoms separation, and distiller's grain drying portions of the process arrangement of the present invention.

Distillation portion 200 shown in FIG. 3, includes a beer column 202, a rectifier column 204 and a side stripper column 206. Beer column 202 receives beer having a maximum ethanol concentration of approximately 15% from fermentation tanks 128. Second effect steam from a second set of evaporators provides heat for boiling off the ethanol from the beer in beer column 202. This second effect steam is mixed directly with the beer as it cascades down through the beer column. The source and routing of this second effect steam is an important aspect of this process arrangement and will be described in greater detail below. The overhead ethanol vapor leaving beer column 202 is about 60% ethanol or 120 proof. The 120 proof ethanol vapor from beer column 202 enters a rectifier column 204 where ethanol vapor having a higher concentration of ethanol (190 proof) is generated as an overhead vapor. Vapor flowing out of rectifier column 204 in condensed into a liquid by a condenser 308 of condensation and dehydration portion 300. The heat that drives rectifier column 204 is present in the hot 120 proof vapors that enter rectifier column 204. The bottoms from rectifier column 204 which have an ethanol concentration of about 20% (or 40 proof) are circulated to a side stripper column 206 which produces a second stream of 120 proof vapor that is circulated back into rectifier column 204 for further dehydration. Side stripper column 206 is heated by flash steam produced when high temperature slurry in hydro-heater 124 is suddenly depressurized to a lower pressure to cool the slurry. The bottoms from side stripper column 206 are mostly hot water and are recycled to a cook water tank 122A.

Condensation and Dehydration portion 300 shown in FIG. 3, receives 190 proof ethanol vapor from distillation portion 200, condenses that vapor and then removes most of the remaining water. In condensation and dehydration portion 300, vapor ethanol product from rectifier column 204 is condensed in condenser 308. The liquid 190 proof ethanol is vaporized and dehydrated in molecular sieve 309. Molecular sieve 309 contains pellets that attract water but reject ethanol. The hot ethanol vapor leaving molecular sieve 309 has a purity exceeding 99.75% or 199.5 proof.

Separation and drying portion 400 shown in FIG. 3, receives beer bottoms containing mostly water, dissolved materials and unfermented solids from the milled grain. Separation and drying portion 400 receives this mixture and removes the solids known as distiller's grains. Beer bottoms from beer column 202 are piped to a centrifuge 410 which separates the beer bottoms into solids known as distiller's grains and a liquid known as thin stillage. The mechanical separation of distiller's grains can be relocated to other points in the process such as to a point prior to beer column 202 or even to a location between the first and second sets of evaporators are mechanically removed from either the beer entering beer column 202 or the beer bottoms that leave beer column 202. In FIG. 3, the distiller's grains are conveyed to a drier 412 for further drying. (If an arrangement different from that shown in FIG. 3 is used in which distiller's grains are mechanically separated from the beer prior to the beer column, then the vapor produced by a drier for drying such distiller's grains should be conveyed back to the distillation arrangement so that ethanol in that vapor can be recovered.) Because distiller's grains are rich in fiber and protein, they can be used as a feed for livestock. As is shown in FIG. 3, the liquid portion or thin stillage leaving centrifuge 410 is divided into two portions. A first portion of the thin stillage is reintroduced into slurry tanks 122 at the beginning of the fermentation portion 100 of the system. A second portion is piped to the evaporation portion 500 of the system.

Figure 4:
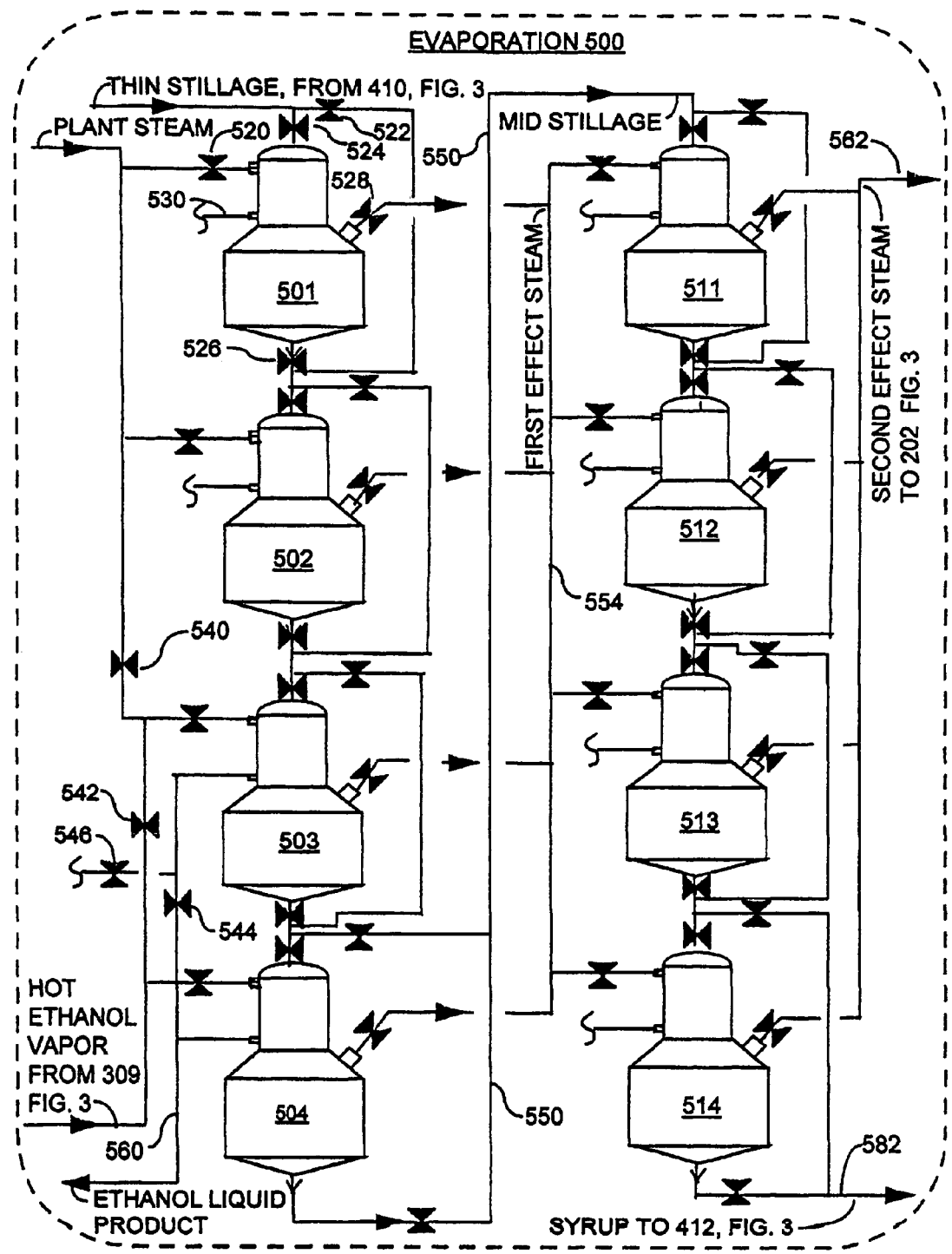
FIG. 4 is a process diagram of the evaporation portion of the process arrangement of the present invention.

Evaporation portion 500 of the system is illustrated in FIG. 4. In evaporation portion 500, two sets of evaporators are used to reduce thin stillage from centrifuge 410 to a thick syrup which can be fed to dryer 412 for further drying. The first set of evaporators 501, 502, 503, and 504, known as first effect evaporators are heated by clean plant steam and hot ethanol vapor. The clean plant steam may be at a pressure between 0 PSIG and 5 PSIG and at a temperature of between 210° F. and 225° F. The hot ethanol vapor, which is also used as a heat source in the first set of evaporators may be at a pressure of 30 PSIG and a temperature of 240° F. For obvious reasons, the hot ethanol vapor, an important and highly purified product of the process arrangement is not mixed with plant steam.

FIG. 4 provides a detailed illustration of the arrangement of the evaporators of evaporator portion 500. Each evaporator in FIG. 4, like evaporator 501 shown in detail in FIG. 5 includes an upper, heat exchanger portion 501A and a lower pot portion 501B. Tubes such as tubes 501A of evaporator 501 convey stillage from an inlet situated above the heat exchanger portion, through the heat exchanger portion and then to the pot portion below. A heating vapor such as steam or, in some cases, hot ethanol vapor is isolated in the shell side of the heat exchanger. It will condense and exit as condensate through a condensate line such as condensate line 530 of evaporator 501.

As can been seen in FIG. 4, evaporators 501 and 502 are configured to be heated with plant steam. Evaporator 504 is configured to be heated with hot ethanol vapor from molecular sieve 309 shown in FIG. 3. However, by opening and closing the appropriate valves, evaporator 503 can be heated either with plant steam or hot ethanol vapor. When valves 540 and 546 are open and valves 542 and 544 are closed, evaporator 503 receives plant steam and discharges water condensate that passes through open valve 546. The water condensate from the evaporators is returned to a water processing unit that feeds the plant steam boilers (not shown). When valves 540 and 546 are closed and valves 542 and 544 are open, evaporator 503 receives hot ethanol vapor and discharges condensed ethanol liquid through open valve 544 to be piped away through ethanol line 560. This liquid ethanol is the primary product of the facility.

Thin stillage from centrifuge 410 enters the top of evaporator 501 and leaves the bottom of evaporator 501 slightly concentrated. Steam that is boiled off from the thin stillage in evaporator 501 enters a first effect steam line 554. Concentrated stillage leaving each evaporator can enter the top of the next evaporator and then finally exits the bottom of the last evaporator of the first effect evaporators as mid stillage in a mid stillage line 550. Because evaporators 501, 502, 503 and 504 produce first effect steam that is used to heat evaporators 511, 512, 513 and 514, they are known as first effect evaporators.

FIG. 4 shows that the various lines leading to the evaporators are valved so that any one of the four evaporators 501, 502, 503 and 504 can be taken off-line and by-passed for maintenance. The facility is designed to operate at full capacity with three first effect evaporators on-line. This provides an important advantage for a facility operator. Any one of the four evaporators can be isolated and shut down for cleaning and maintenance without compromising the operation of the plant.

Figure 5:
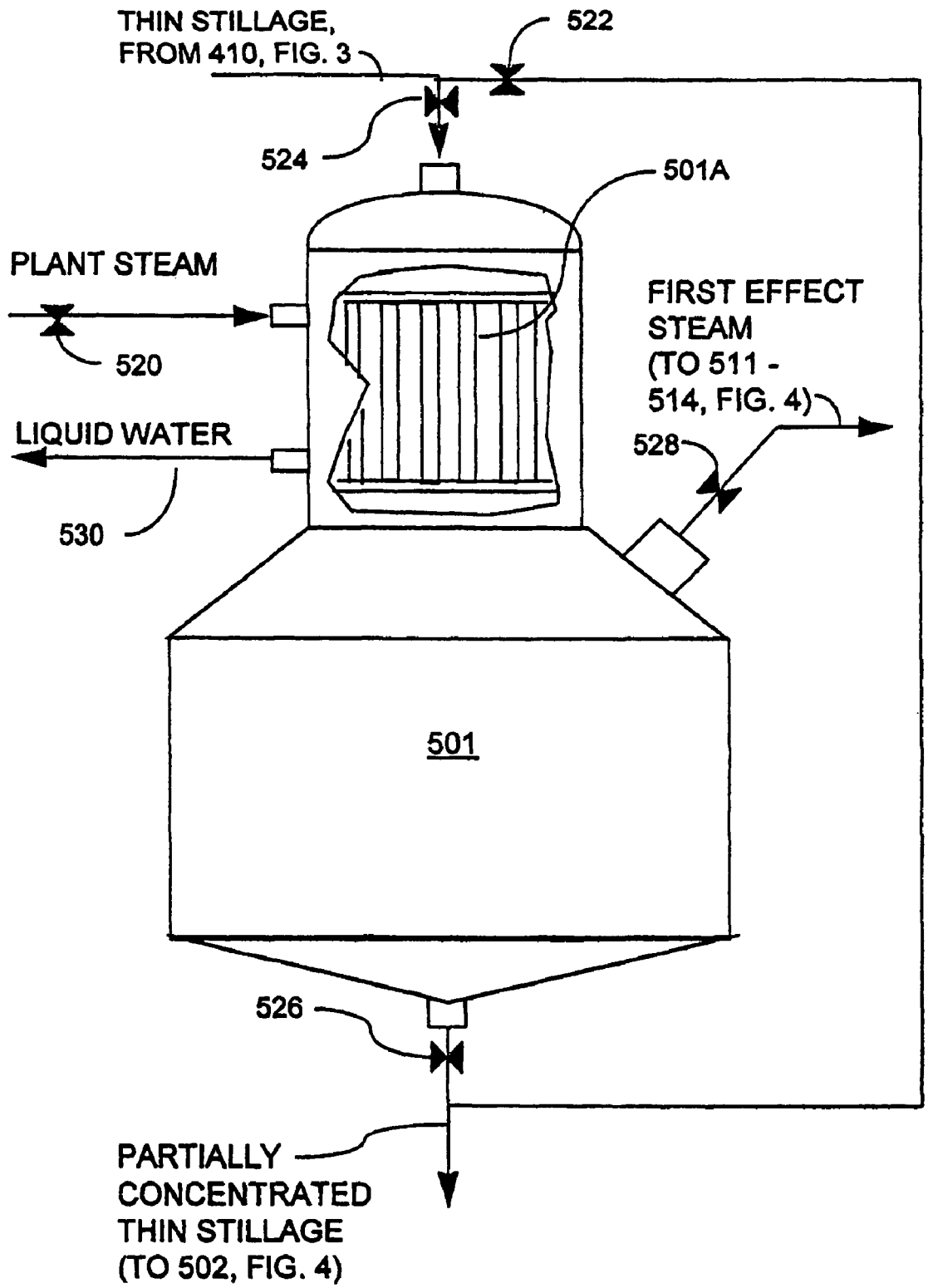
FIG. 5 illustrates a typical evaporator employed by the evaporation portion of the process arrangement of the present invention.

The function of the valves that control the operation of evaporator 501 can be understood by with reference to FIG. 5. FIG. 5 generally shows how an evaporator in either set may be put on-line or taken off-line. Evaporator 501 is on-line when a steam line valve 520 is open, when a thin stillage intake valve 524 is open, when thin stillage outlet valve 526 is open, when a first effect steam outlet valve 528 is open and when thin stillage bypass valve 522 is closed. When valves 520, 522, 524 and 530 are in this configuration, evaporator 501 receives plant steam for heating, receives thin stillage for evaporation, produces first effect steam for use by the second effect evaporators (evaporators 511, 512, 513 and 514) and produces slightly concentrated stillage for further evaporation by evaporator 502 if evaporator 502 is on-line. Evaporator 501 is off-line when steam line valve 520 is closed, when a thin stillage intake valve 524 is closed, when first effect steam outlet valve 528 is closed and when thin stillage bypass valve 522 is open. When valves 520, 522, 524 and 528 are in this configuration, evaporator 501 does not receive plant steam, thin stillage or even a back flow of first effect steam. When in this configuration, thin stillage bypasses evaporator 501 and flows into evaporator 502. The evaporators in both sets may be put on-line or taken off-line in the same manner. However, it is preferable that only one evaporator in each set be taken off-line at any given time. When off-line, an evaporator can be cleaned or can receive maintenance.

The arrangement and operation of second effect evaporators 511, 512, 513 and 514 is much like the first effect evaporators 501, 502, 503 and 504, except that they operate at a lower pressure and temperature and they are heated by first effect steam collected from first effect evaporators 501, 502, 503 and 504. The first effect steam generated by the first effect evaporators is preferably at a pressure of 13.5 PSIA (or −1.5 PSIG) and at a temperature of 205° F. The second effect evaporators process mid stillage until it is concentrated into a syrup that is conveyed in syrup line 582 back to dryer 412. The steam generated in second effect evaporators 511, 512, 513 and 514 is second effect steam. This relatively low pressure, second effect steam is collected from the various outlets of second effect evaporators 511, 512, 513 and 514 by second effect steam line 562. Second effect steam line 562 then conveys the second effect steam to beer column 202 to provide sufficient heat for the distillation process in beer column 202. Preferably, the second effect steam is at a pressure of approximately 10 PSIA (−5.0 PSIG) and at a temperature between 185° F. and 190° F.

As with first effect evaporators 501 through 504, all of the connections to second effect evaporators 511 through 514 are arranged and valved so that any one of the four second effect evaporators 511 through 514 can be taken off-line and by-passed for cleaning and maintenance. The facility is designed to operate at full capacity with the use of only three of the four second effect evaporators.

As shown in FIG. 3, inside beer column 102, fermented ethanol present in the beer produced by fermentation portion 100 is boiled out as overhead 120 proof vapor. Second effect steam from second effect evaporators 511, 512, 513 and 514 provide the necessary steam to remove over 99.5% of the beer's ethanol as 120 proof overhead vapor. The quantity of second effect steam needed from evaporators 511, 512, 513 and 514 for efficient ethanol recovery determines the evaporation capacity of evaporator portion 500. That is, the steam requirements of beer column 202 of distillation portion 200 determines the evaporation capacity of evaporation portion 500. When the steam requirement of beer column 202 increases, the evaporation capacity of evaporation portion 500 increases, so that more thin stillage from centrifuge 410 can be conveyed to evaporation portion 500 and less thin stillage from centrifuge 410 is recycled back to slurry tank 122 of fermentation portion 100. Conversely, when beer column 202 requires less steam, then less thin stillage is sent to evaporation portion 500 and more is recycled back to slurry tank 122. On average, approximately 55% of the thin stillage from centrifuge 410 is sent to evaporation portion 500 while 45% of the thin stillage from centrifuge 410 is recycled back to slurry tank 122 of fermentation portion 100.

The concentration of solids in the syrup flowing through syrup line 582 shown in FIG. 4 decreases as the percentage of water evaporated from the thin stillage entering evaporation portion 500 decreases. Changing the flow rate of syrup in syrup line 582 causes a substantially equal change in the amount of thin stillage that is received by evaporation portion 500. The basic purpose of evaporation portion 500 is to concentrate syrup solids. Accordingly, the flow rate of syrup in line 582 should be optimized for a syrup having the highest possible concentration of solids.

The use of second effect steam generated by second set of evaporators 511 through 514 to heat beer column 202 of distillation portion 200 of the system provides important advantages. Although a vacuum must be maintained in beer column 202 and the other distillation columns, the low temperature operation is not only adequate for boiling off ethanol, it is advantageous. Lower temperature operation greatly reduces the deposition of solids within the beer column. Further, the use of second effect steam eliminates the need to use clean plant steam in a distillation process that would contaminate the clean, plant steam. In the present process arrangement, clean plant steam is only used in shell and tube heat exchanger portions of the first effect evaporators where it can be isolated from contaminants so that it can be easily reused in steam boilers as make up water.

Thus, the invention process arrangement meets the objects noted above by providing an ethanol distillation process having evaporators in sets of evaporators that can be selectively taken off-line for cleaning and maintenance without effecting the operation of the overall ethanol distillation process. The problems associated with shutting down an ethanol distillation facility in order to clean and maintain evaporators have been eliminated. Moreover, the invention process arrangement meets the objects noted above by providing an ethanol distillation process in which second effect steam from a set of second effect evaporators can be used to provide heat for the beer column. This allows distillation to be conducted with a minimum usage of plant steam.

Numerous modifications and variations of this preferred embodiment may occur to those skilled in the art in light of this disclosure. Accordingly, it is expressly to be understood that these modifications and variations, and equivalents thereof, shall be considered to be within the spirit and scope of the invention as defined in following claims, Wherein I claim:

1. A method for separating ethanol from ethanol laden beer comprising the steps of:
  (a) fermenting a mixture of water and milled grain to produce ethanol laden beer,
  (b) distilling the ethanol-laden beer from step (a) in a beer column maintained at a pressure below atmospheric pressure by a condenser to produce:
    (i) a vapor primarily including ethanol which is condensed by the condenser into a liquid primarily including ethanol, and,
    (ii) byproducts including thin stillage, the thin stillage including primarily water, (c) evaporating water from the thin stillage to produce mid stillage and first effect steam, (d) evaporating water from the mid stillage produced in step (c) with heat from the first effect steam produced in step (c) to produce second effect steam and byproducts including a syrup, (e) using the second effect steam produced in step (d) to supply sufficient heat for the distillation step of (b) in said beer column.

2. The method of claim 1, wherein;
the step of evaporating water from the thin stillage to produce mid stillage is conducted using at least two first effect evaporators arranged in a series fashion and arranged so that one of the evaporators can be bypassed while the remaining at least one first effect evaporator continues to operate, and wherein,
the step of evaporating water from the mid stillage is conducted using at least two second effect evaporators arranged in a series fashion and arranged so that one of the evaporators can be bypassed while the remaining at least one second effect evaporator continues to operate.

3. The method of claim 1, wherein;
the step of evaporating water from the thin stillage to produce mid stillage is conducted using three or more first effect evaporators arranged in a series fashion and arranged so that one of the evaporators can be bypassed while the remaining first effect evaporators continue to operate, and wherein,
the step of evaporating water from the mid stillage is conducted using three or more second effect evaporators arranged in a series fashion and arranged so that one of the evaporators can be bypassed while the remaining second effect evaporators continue to operate.

4. A method for separating ethanol from ethanol laden beer comprising the steps of:
(a) fermenting a mixture of water and milled grain to produce ethanol laden beer,
(b) distilling the ethanol laden beer from step (a) in a beer column maintained at a pressure below atmospheric pressure by a condenser to produce:
(i) a vapor primarily including ethanol which is condensed by the condenser into a liquid primarily including ethanol, and,
(ii) byproducts including thin stillage, the thin stillage including primarily water,
(c) evaporating water from the thin stillage to produce mid stillage and first effect steam using three or more first effect evaporators arranged in a series fashion and arranged so that one of the evaporators can be bypassed while the remaining first effect evaporators continue to operate,
(d) evaporating water from the mid stillage produced in step (c) with heat from the first effect steam produced in step (c) to produce second effect steam and byproducts including a syrup using three or more second effect evaporators arranged in a series fashion and arranged so that one of the evaporators can be bypassed while the remaining second effect evaporators continue to operate,
(e) using the second effect steam produced in step (d) to supply sufficient heat for the distillation step of (b).

5. The method of claim 4, further comprising:
a step of mechanically separating solids from the byproducts of step (b) (ii).

6. The method of claim 4, further comprising:
a step of mechanically separating solids from the byproducts of step (b) (ii),
and a step of drying the solids from the above step and the syrup produced in step (d) to produce feed for livestock.

7. The method of claim 4, wherein;
the second effect steam generated in step (d) is maintained at a temperature substantially between 185 degrees Fahrenheit and 190 degrees Fahrenheit.

8. The method of claim 4, wherein;
the second effect steam generated in step (d) is maintained at a temperature substantially between 185 degrees Fahrenheit and 190 degrees Fahrenheit and at a pressure of substantially 10 PSIA.

9. The method of claim 4, wherein;
the first effect steam generated in step (c) is maintained at a temperature of substantially 205 degrees Fahrenheit and at a pressure of substantially 13.5 PSIA.

10. The method of claim 4, wherein;
the first effect steam generated in step (c) is maintained at a temperature of substantially 205 degrees Fahrenheit and at a pressure of substantially 13.5 PSIA, and,
the second effect steam generated in step (d) is maintained at a temperature substantially between 185 degrees Fahrenheit and 190 degrees Fahrenheit and at a pressure of substantially 10 PSIA.

11. A method for separating ethanol from ethanol laden beer comprising the steps of:
(a) fermenting a mixture of water and milled grain to produce ethanol laden beer,
(b) distilling the ethanol laden beer in a beer column maintained at a pressure below atmospheric pressure by a condenser to produce:
(i) a vapor primarily including ethanol which is condensed by the condenser into a liquid primarily including ethanol, and,
(ii) byproducts including thin stillage, the thin stillage including primarily water,
(c) heating and dehydrating the liquid primarily including ethanol from step (b) with a molecular sieve to produce heated ethanol vapor,
(d) evaporating water from the thin stillage to produce mid stillage and first effect steam using three or more first effect evaporators arranged in a series fashion and arranged so that one of the evaporators can be bypassed while the remaining first effect evaporators continue to operate, and wherein at least one of said three or more first effect evaporators receives said heated ethanol vapor from step (c) and condenses said heated ethanol vapor thereby using the heated ethanol vapor as a heat source for evaporating water from the thin stillage,
(e) evaporating water from the mid stillage produced in step (d) with heat from the first effect steam produced in step (d) to produce second effect steam and byproducts including a syrup using three or more second effect evaporators arranged in a series fashion and arranged so that one of the evaporators can be bypassed while the remaining second effect evaporators continue to operate,
(f) using the second effect steam produced in step (e) to supply sufficient heat for the distillation step of (b).

12. The method of claim 11, further comprising;
a step of mechanically separating solids from the byproducts of step (b) (ii).

13. The method of claim 11, further comprising;
a step of mechanically separating solids from the byproducts of step (b) (ii),
and a step of drying the the solids from the above step and the syrup produced in step (e) to produce feed for livestock.

14. The method of claim 11, wherein;
the second effect steam generated in step (e) is maintained at a temperature substantially between 185 degrees Fahrenheit and 190 degrees Fahrenheit.

15. The method of claim 11, wherein;

the second effect steam generated in step (e) is maintained at a temperature substantially between 185 degrees Fahrenheit and 190 degrees Fahrenheit and at a pressure of substantially 10 PSIA.

16. The method of claim 11, wherein;

the first effect steam generated in step (d) is maintained at a temperature of substantially 205 degrees Fahrenheit and at a pressure of substantially 13.5 PSIA.

17. The method of claim 11, wherein;

the first effect steam generated in step (d) is maintained at a temperature of substantially 205 degrees Fahrenheit and at a pressure of substantially 13.5 PSIA, and, the second effect steam generated in step (e) is maintained at a temperature of substantially between 185 degrees Fahrenheit and 190 degrees Fahrenheit and at a pressure of substantially 10 PSIA.

* * * * *